(12) United States Patent
Wu et al.

(10) Patent No.: US 11,996,691 B2
(45) Date of Patent: May 28, 2024

(54) LOCAL CONTROL OF AN ELECTRICITY DISTRIBUTION NETWORK USING VOLTAGE-SOURCE CONVERTERS

(71) Applicant: UNIVERSITY COLLEGE CARDIFF CONSULTANTS LTD., Cardiff South Glamorgan (GB)

(72) Inventors: Jianzhong Wu, Cardiff (GB); Chao Long, Cardiff (GB)

(73) Assignee: University College Cardiff Consultants Ltd., Cardiff South Glamorgan (GB)

( * ) Notice: Subject to any disclaimer, the term of this patent is extended or adjusted under 35 U.S.C. 154(b) by 40 days.

(21) Appl. No.: 17/997,836

(22) PCT Filed: Apr. 29, 2021

(86) PCT No.: PCT/GB2021/051031
§ 371 (c)(1),
(2) Date: Nov. 3, 2022

(87) PCT Pub. No.: WO2021/224592
PCT Pub. Date: Nov. 11, 2021

(65) Prior Publication Data
US 2023/0352940 A1 Nov. 2, 2023

(30) Foreign Application Priority Data
May 4, 2020 (GB) ........................ 2006520

(51) Int. Cl.
*H02J 3/16* (2006.01)
*H02J 3/46* (2006.01)
(52) U.S. Cl.
CPC ................... *H02J 3/16* (2013.01); *H02J 3/46* (2013.01); *H02J 2300/24* (2020.01); *H02J 2300/28* (2020.01)

(58) Field of Classification Search
CPC ........................................... H02J 3/16
See application file for complete search history.

(56) References Cited

U.S. PATENT DOCUMENTS

2005/0012395 A1* 1/2005 Eckroad ............... H02J 9/062
307/44
2012/0292904 A1* 11/2012 Tarnowski ............ H02P 9/42
290/44

(Continued)

FOREIGN PATENT DOCUMENTS

| CN | 107732926 A | 2/2018 |
|----|-------------|--------|
| WO | 2012159952 A1 | 11/2012 |
| WO | 2013083850 A2 | 6/2013 |
| WO | 2016012411 A1 | 1/2016 |
| WO | 2017061109 A1 | 4/2017 |
| WO | 2017178480 A1 | 10/2017 |

OTHER PUBLICATIONS

Latorre, et al., "Active and Reactive Power Control of a VSC-HVdc", Apr. 24, 2008, Electric Power Systems Research, Royal Institute of Technology, Electric Power Systems, Stockhom, Sweeden. pp. 1756-1763 (Year: 2008).*

(Continued)

*Primary Examiner* — Adi Amrany
(74) *Attorney, Agent, or Firm* — Dinsmore & Shohl LLP

(57) ABSTRACT

A method of controlling an electricity distribution network, wherein the electricity distribution network is a mesh network including a plurality of loads and there is a voltage-source converter connected to a point in the network. The method comprises, while using the voltage-source converter to try to hold the voltage magnitude constant at said point, establishing a record of how, at said point, the real power flowing between the network and the voltage-source converter varies with variation of the reactive power that the voltage-source converter causes to flow between itself and the network, using a reactive-power value, proportional to the sum of the reactive-power draws of the loads, in order to look up a real-power value from the record, and configuring (Continued)

the voltage-source converter to supply into the network at said point reactive and real power at said reactive- and real-power values, respectively.

20 Claims, 4 Drawing Sheets

(56) References Cited

U.S. PATENT DOCUMENTS

| | | | |
|---|---|---|---|
| 2013/0250653 A1 | 9/2013 | Sivakumar et al. | |
| 2015/0340859 A1 | 11/2015 | Barker | |
| 2016/0285269 A1* | 9/2016 | Majumder | H02J 3/16 |
| 2017/0063255 A1* | 3/2017 | Jasim | H02M 7/217 |

OTHER PUBLICATIONS

Majumder, Ritwik, "Aspect of Voltage Stability and Reactive Power Support in Active Distribution", 2014, The Institute of Engineering and Technology, vol. 8, Issue 3, pp. 442-450. (Year: 2014).*

International Search Report and Written Opinion in PCT/GB2021/051031 dated Jul. 8, 2021, 11 pages.

British Search Report for App. No. GB2006520.7 dated Oct. 14, 2020, 4 pages.

British Search Report for App. No. GB1816580.3 dated Mar. 26, 2019, 10 pages.

* cited by examiner

LOCAL CONTROL OF AN ELECTRICITY DISTRIBUTION NETWORK USING VOLTAGE-SOURCE CONVERTERS

CROSS-REFERENCE TO RELATED APPLICATIONS

The present application is a U.S. National Phase of PCT/GB2021/051031, entitled "LOCAL CONTROL OF AN ELECTRICITY DISTRIBUTION NETWORK USING VOLTAGE-SOURCE CONVERTERS" and filed on Apr. 29, 2021, which claims priority to GB Application No. 2006520.7, entitled "Local Control of an Electricity Distribution Network" and filed on May 4, 2020, the entire contents of both are incorporated herein.

FIELD OF INVENTION

The invention relates to the field of electrical power distribution networks and control of Voltage-Source Converters (VSC).

BACKGROUND

In the UK, the "electrical grid" is the name given to the system for transmitting and distributing electrical power from electrical energy sources (e.g. power stations) to electrical consumers (e.g. large industry, businesses or homes). In approximate terms, the electrical grid can be thought of as containing power stations that supply electrical power to a transmission network that in turn supplies power to regional distribution networks, which in turn supply electrical power to consumer premises (e.g. homes and businesses). The transmission network operates at a Very High Voltage (typically 275 kV or 400 kV), in order to improve the efficiency of the delivery of electrical power. Substations connect the regional distribution networks to the transmission network and serve to lower the voltage down to High Voltage (typically to 132 kV). Further substations connect the 132 kV distribution networks to distribution networks with lower voltage levels, and operate to reduce the High Voltage to Medium Voltage (typically 33 kV and 11 kV) and Low Voltage (typically 400V three-phase line-to-line voltage and 230V single phase line-to-neutral voltage) for delivery to consumer premises.

With the advent of a high penetration of distributed generators (DGs), such as solar and wind farms, a great amount of power can be supplied directly to distribution networks. Under certain circumstances with high DG output or high demand (e.g. with a high penetration of heat pumps and electric vehicles), power flow could exceed the thermal limits of cables and overhead lines—this could ultimately cause cable insulation failure or damage transformers and power lines, and voltage also could violate the limits. Thus, the possibility of faults increases with high DG penetrations and high levels of power demand.

SUMMARY

According to one aspect, the invention provides a method of controlling an electricity distribution network, wherein the electricity distribution network is constructed as a mesh network including a plurality of loads and there is a voltage-source converter connected to a point in the network. While using the voltage-source converter to try to hold the voltage magnitude constant at the point, a record is established of how, at the point, the real power flowing between the network and the voltage-source converter varies with variation of the reactive power that the voltage-source converter causes to flow between itself and the network. A reactive-power value, proportional to the sum of the reactive-power draws of the loads, is used in order to look up a real-power value from the record (in some embodiments, the proportion is one half). The voltage-source converter is configured to supply into the network at the point reactive and real power at the reactive- and real-power values, respectively.

In some embodiments, establishing the record involves establishing a set of power-value co-ordinate pairs and fitting a curve to the co-ordinate pairs to describe the relationship between real- and reactive-power flows at the point. The reactive-power value is used to look up the real-power value from the curve. Each co-ordinate pair may comprise a reactive-power amount and a real-power amount measured as flowing into the network at the point. In some embodiments, the curve is described by an equation linking real power and reactive power when the voltage magnitude is constant at the point. In some embodiments, the equation is a straight-line equation. In some embodiments, the equation assumes the network can be modelled as a pi-equivalent circuit.

In some embodiments, the reactive-power draws are harvested from logs produced at each of the loads.

In some embodiments, a negative real- or reactive-power amount means a flow of real or reactive power, respectively, from the network into the voltage-source converter.

In some embodiments, the voltage-source converter is connected at the point via an isolating transformer.

In some embodiments, the network includes distributed generators, such as sources of solar and wind power.

In some embodiments, the voltage-source converter is connected via a DC link to another voltage-source converter connected to another section of the electricity distribution network.

In some embodiments, a controller controls the voltage-source converters to control power flow between the two networks.

The invention also relates to apparatus for performing, and to computer program code for causing data processing equipment to perform, the aforementioned methods.

BRIEF DESCRIPTION OF FIGURES

By way of example only, certain embodiments of the invention will now be described with reference to the accompanying drawings, in which.

DETAILED DESCRIPTION

Figure 1:
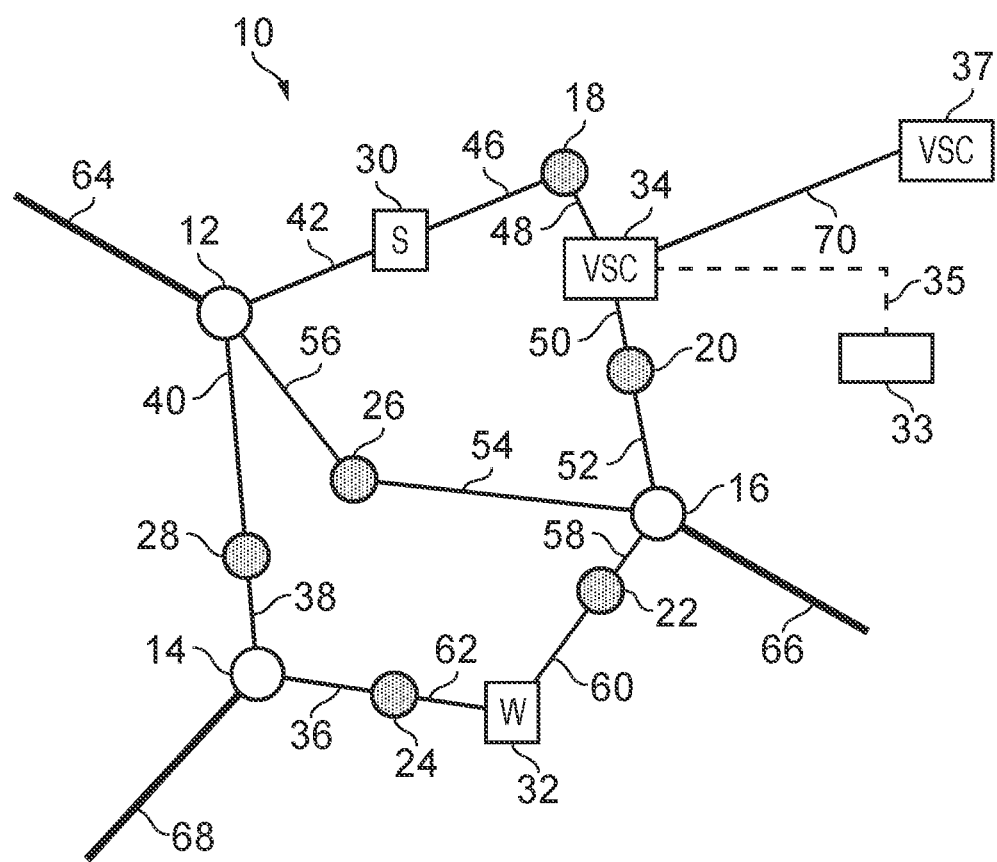
FIG. 1 is a block diagram schematically illustrating a Medium-Voltage distribution network.

FIG. 1 shows a distribution network 10 operating as part of an electricity supply network for delivering generated power to consumer premises, i.e. industrial, commercial or residential. The distribution network 10 comprises substations 12-28, distributed generators (DGs) 30 and 32, a voltage-source converter (VSC) 34, and distribution lines 36-62 interconnecting the substations 12-28, DGs 30 and 32 and VSC 34. In this example, the operating voltage in the distribution network 10 is 33 kV. Power is supplied to the distribution network 10 from 132 kV lines 64-68 which are more thickly drawn in the figure, form part of a High Voltage regional distribution network (no other parts of which are shown), and are connected into substations 12-16. Each of the substations 12-16 is designed to transform the 132 kV voltage to 33 kV. Substations 18-28 deliver power from the network 10 to lower-voltage substations (not shown), which in turn supply customer premises (again, not shown). In this example, substations 18-28 transform the 33 kV voltage of the distribution network 10 down to 11 kV.

If the distribution network 10 followed the classical model, the substations 12-16 would be responsible for the flow of power into the network 10, and the substations 18-28 would be responsible for the flow of power out of the network 10. However, distribution network 10 differs from the classical model in that the network also includes DGs 30 and 32, and VSC 34. DGs 30 and 32 are a solar array and a wind farm, respectively, and they feed electrical power into the distribution network 10. The VSC 34 can function as both a source and a sink of electrical power. In the exemplary scenario shown in FIG. 1, the VSC 34 is connected to another VSC 37 over a DC link 70. VSC 37 is connected to another distribution network (not shown) that is analogous to distribution network 10. The two VSCs 34 and 37 cooperate to transfer power between the two distribution networks as necessary to meet customer demands and satisfy network operating constraints. The nature and operation of VSC 34 will now be described in more detail, with reference to FIG. 2.

A voltage-source converter—or VSC—is a power-electronics device that has AC and DC terminals and can control the flow of power between those terminals and the voltage at the DC terminal. Commonly, a VSC comprises a set of insulated-gate bipolar transistors (IGBTs) that are switched on and off according to an algorithm. The VSC 34 is an example of this type, and its structure is schematically illustrated in FIG. 2.

Figure 2:
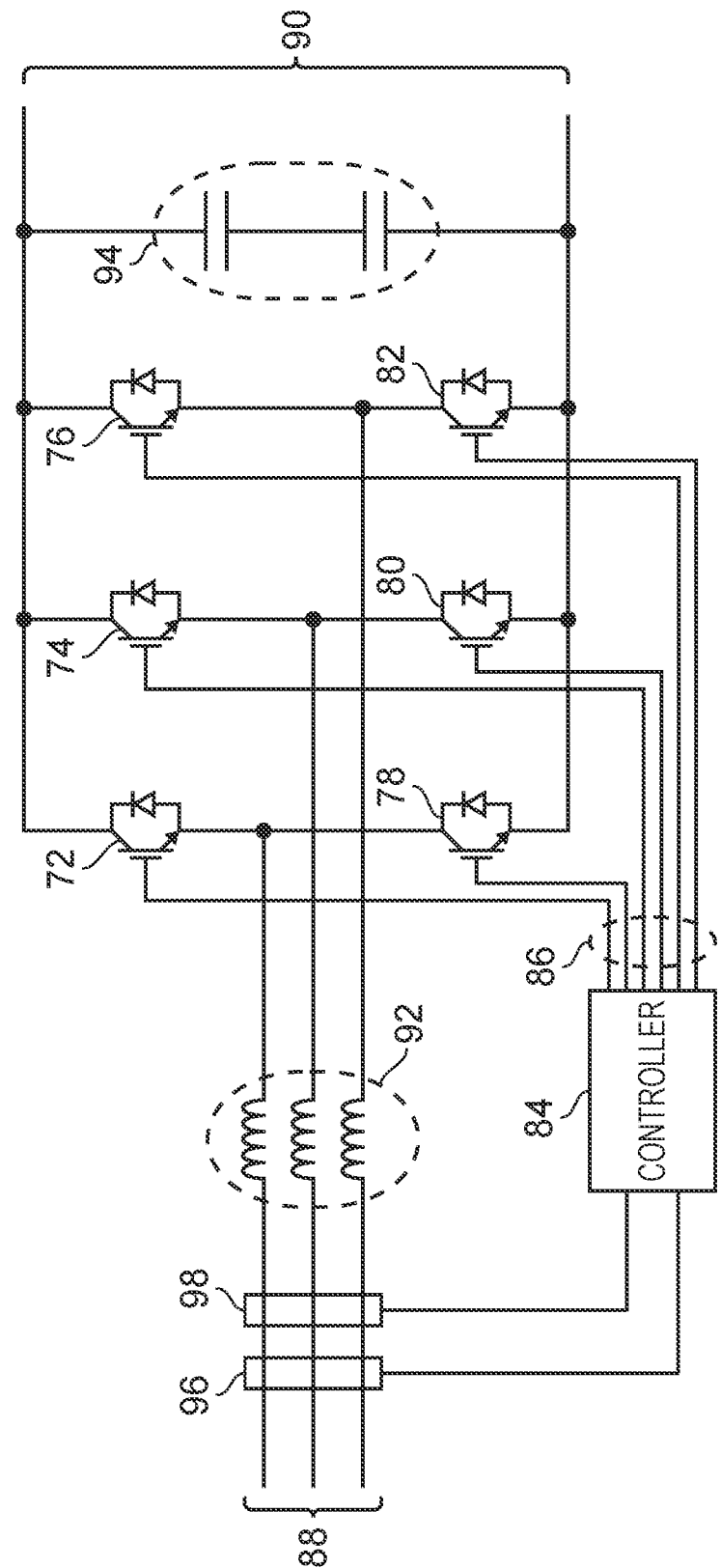
FIG. 2 is a block diagram schematically illustrating a voltage-source converter.

As shown in FIG. 2, VSC 34 has six arms in a bridge configuration, each arm containing a respective IGBT 72-82. The VSC 34 also includes a controller 84 that produces pulse-width-modulated (PWM) signals 86 for controlling switching of the IGBTs 72-82. Further, the VSC 34 has AC and DC terminals 88 and 90, respectively. The AC terminal 88 is connected into the distribution network by an isolating transformer (not shown). The voltage and current of the AC terminal 88 are measured by voltage and current sensors 96 and 98, respectively. Low pass filters 92 are provided for smoothing the AC voltage produced by the IGBTs 72-82. Capacitors 94 limit DC ripple in the DC voltage at terminal 90.

The voltage characteristics at the AC and DC terminals 88 and 90 and the direction of and magnitude of real and reactive power flow (if any) between those terminals is dictated by the PWM signals 86. The PWM signals 86 are produced by the controller 84. The controller 84 develops the PWM signals 86 using an algorithm which takes as inputs the current and voltage measurements from the sensors 96 and 98 and, inter alia, commands from the power company operating the distribution network 10. These commands can be provided locally via a user interface provided on the VSC 34 or remotely via a data connection. In this particular example, the VSC 34 is controlled by controller 33 via interface 35.

Typically, the power company will direct the VSC 34 to attempt to maintain a target AC voltage at terminal 88, and the VSC 34 will then absorb reactive power from, or inject reactive power into, the distribution network 10 as necessary in order to maintain the target AC voltage at terminal 88.

Figure 3:
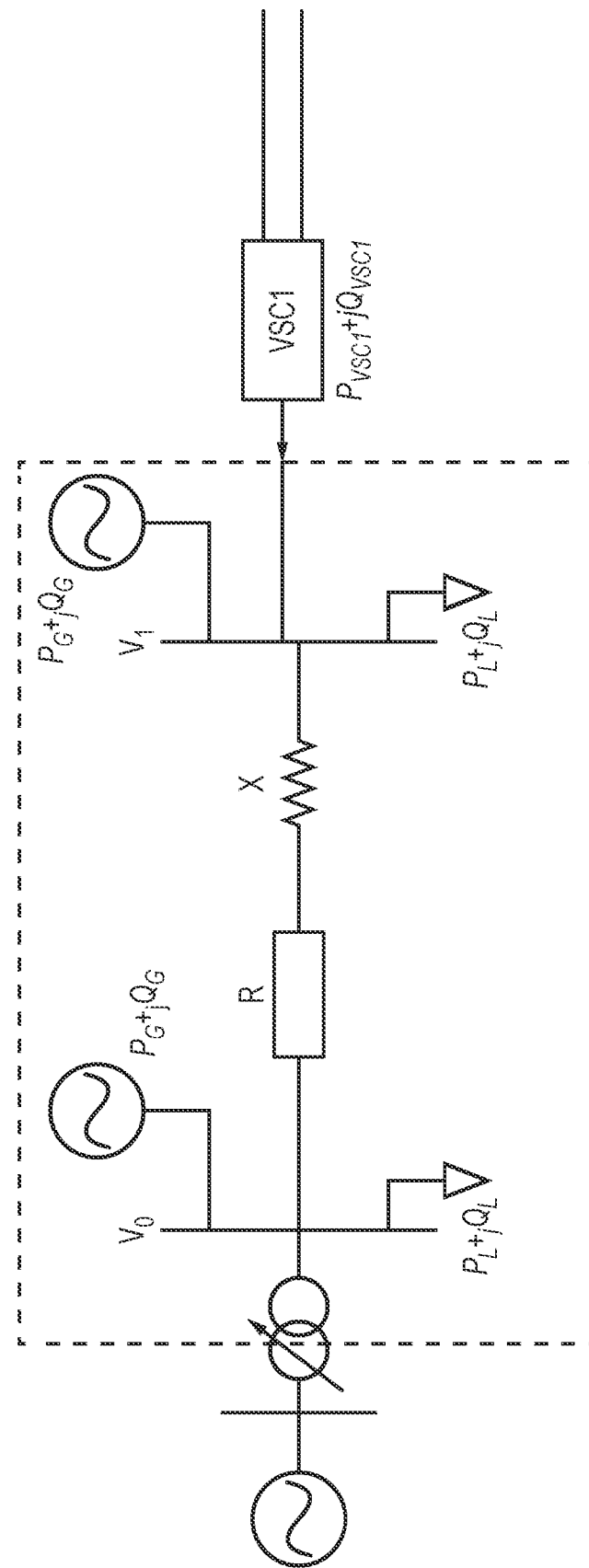
FIG. 3 is a pi-equivalent model of a Medium-Voltage distribution network (with the line capacitive reactance neglected)

The distribution network 10 can be modelled as a pi-equivalent circuit of the form shown in FIG. 3. As the distribution network 10 is a meshed network, the pi-equivalent circuit in FIG. 3 simplifies the network 10 to a two-terminal line structure from the power supplies (i.e. substations 12-16) as one terminal and electricity load with VSC as the other terminal. The various parameters in FIG. 3 will now be explained:

a) $2P_G$ is the cumulative value of the active power supplied to the distribution network 10 by the various distributed generators present, i.e., DGs 30 and 32.

b) $2Q_G$ is the cumulative value of the reactive power supplied to the distribution network 10 by the various distributed generators present, i.e., by DGs 30 and 32.

c) $2P_L$ is the cumulative value of the active power drawn from the distribution network 10 by the various loads present, i.e. by substations 18-28.

d) $2Q_L$ is the cumulative value of the reactive power drawn from the distribution network 10 by the various loads present, i.e. by substations 18-28.

e) R is the line resistance of the transmission lines in network 10.

f) X is the line reactance of the transmission lines in network 10.

g) $P_{VSC1}$ is the active power supplied to the distribution network 10 by the VSC 34. If the value is negative, then the VSC 34 is drawing active power from the distribution network 10.

h) $Q_{VSC1}$ is the reactive power supplied to the distribution network by the VSC 34. If the value is negative, then the VSC 34 is drawing reactive power from the distribution network 10.

i) $V_o$ is the voltage at the secondary side of the transformers (not shown) of each of the substations 12-16.

j) $V_1$ is the voltage at the AC terminal 88 at which the VSC 34 is connected into the distribution network 10.

The approximate voltage drop throughout the circuit of FIG. 3 is:

$$\Delta V = V_o - V_1 = \frac{R(P_L - P_G - P_{VSC1}) + X(Q_L - Q_G - Q_{VSC1})}{V_o} \quad \text{equation 1}$$

DGs are normally operated with unity power factor to maximise their active power output. Thus, $Q_G$ can be assumed to be zero. Additionally, in order to minimise the losses in the distribution network 10, the VSC 34 is operated to try to match $V_1$ to $V_o$. Under those circumstances, $\Delta V$ will be zero. In this context, equation 1 becomes:

$$R(P_L - P_G - P_{VSC1}) + X(Q_L - Q_{VSC1}) = 0 \quad \text{equation 2}$$

Equation 2 can be rearranged as:

$$RP_{VSC1} + XQ_{VSC1} = R(P_L - P_G) + XQ_L \quad \text{equation 3}$$

Equation 3 can be rearranged into the format of an equation describing a straight line linking variables $P_{VSC1}$ and $Q_{VSC1}$:

$$P_{VSC1} = -\frac{X}{R}Q_{VSC1} + \frac{R(P_L - P_G) + XQ_L}{R} \quad \text{equation 4}$$

Figure 4:
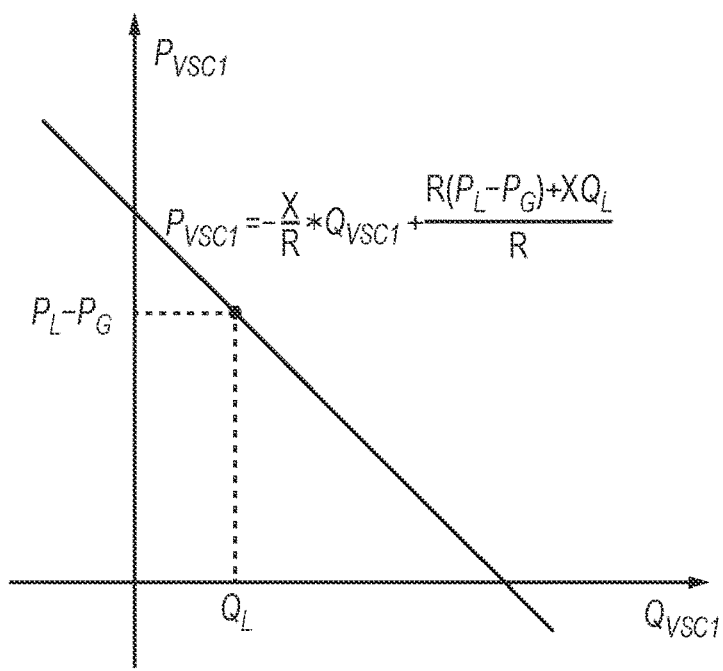
FIG. 4 is a plot of a straight-line equation derived from the model of FIG. 3.

This straight line is plotted in FIG. 4. Equation 4 can be rewritten as:

$$P_{VSC1} = mQ_{VSC1} + C \qquad \text{equation 5}$$

where $$m = -\frac{X}{R}$$

is the gradient of the straight line and $$c = \frac{R(P_L - P_G) + XQ_L}{R}$$

is the intercept with the $Q_{VSC1}$ axis. Thus, it should be possible to fit a straight line to the variables $P_{VSC1}$ and $Q_{VSC1}$ of VSC 34.

As mentioned earlier, a power company will normally aim to minimise power loss in a distribution network, and, in the case of the pi equivalent circuit of FIG. 3, power losses are represented by current flowing through X and R, and if $V_1$ matches $V_o$, then there is no current flow through, and therefore no power losses in, X and R. With reference again to equation 1, it should be apparent that $\Delta V$ will be zero if $P_L - P_G - P_{VSC1}$ and that $Q_L - Q_G - Q_{VSC1}$ both equal zero. $P_L - P_G - P_{VSC1} = 0$ can be rearranged as $P_{VSC1} = P_L - P_G$ and $Q_L - Q_G - Q_{VSC1} = 0$ can be rearranged as $Q_{VSC1} = Q_L - Q_G$, respectively. Moreover, given that DGs are normally operated with $Q_G = 0$, the expression $Q_{VSC1} = Q_L - Q_G$ can be approximated as $Q_{VSC1} = Q_L$. Therefore, in order to achieve the minimum losses state where $\Delta V = 0$, the active power of the VSC 34 needs to be set to $P_L - P_G$ and the reactive power of the VSC 34 needs to be set to $Q_L$. As will now be explained, $Q_L$, m and c can all be estimated, which allows equation 5 to be used to calculate the active power value of $P_{VSC1}$ that, when applied by the VSC 34 together with the reactive power value of $Q_{VSC1} = Q_L$, will put the distribution network into an approximation of the minimum power loss state.

The quantity $Q_L$ is one half of the sum of all the reactive loads in the distribution network 10—see point d) above. Inspection of logs of reactive load data for real distribution networks indicates that the $Q_L$ can be stable over a relatively long period of time. For example, historical data logs for the distribution network that covers the island of Anglesey indicate that the reactive power drawn by all of the 33 kV loads—equivalent to the loads represented by substations 18-28 in FIG. 1 that is modelled by the pi equivalent circuit of FIG. 3—was approximately constant over the course of a one-year period. Therefore, it can be validly assumed that a value for $Q_L$ can be obtained by visiting the substations 12-18 periodically to measure the reactive power that they each draw, summing the results and then halving the total. It is therefore suggested that this exercise for establishing $Q_L$ be repeated on a six-monthly basis, which is prudently within the one-year period of stability apparent from investigating the Anglesey data.

Figure 5:
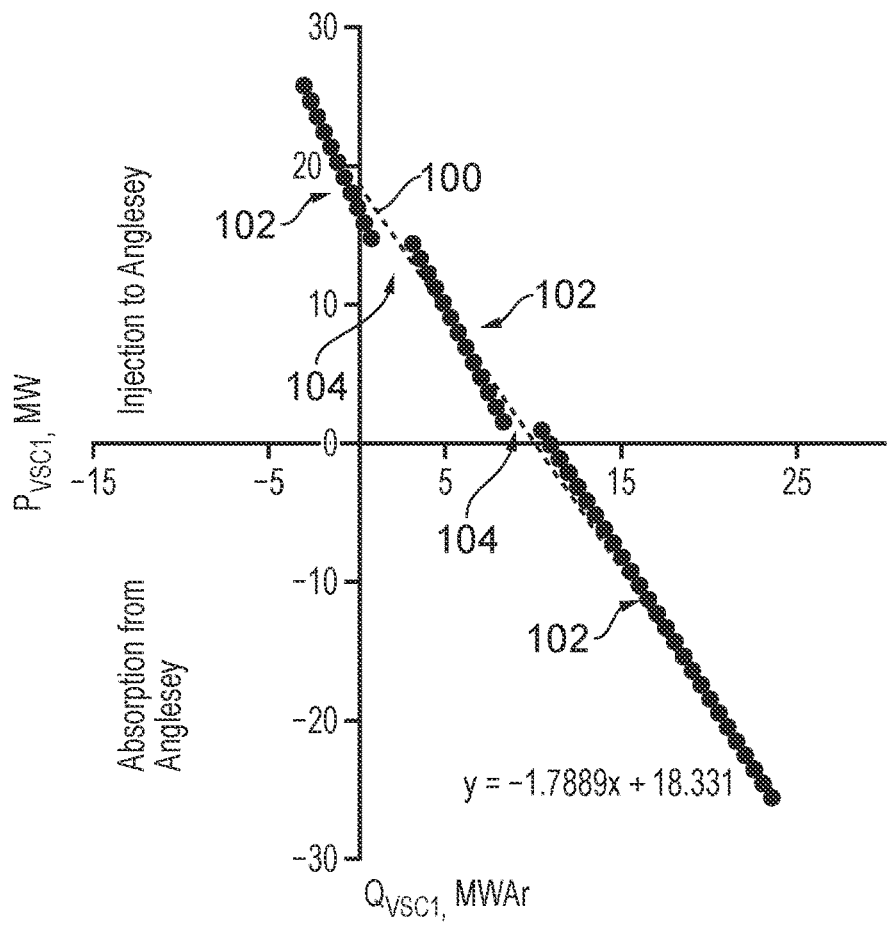
FIG. 5 is a plot of a straight line fitted to measured active and reactive power values.

The parameters m and c for equation 5 are obtained by recording at the VSC 34 values of the active power $P_{VSC1}$ that it injecting into the distribution network 10 as the VSC 34 sweeps, stepwise, the reactive power $Q_{VSC1}$ that it injects into the distribution network 10. For each setting of $Q_{VSC1}$, the VSC 34 makes a corresponding measurement of $P_{VSC1}$. A straight line is then fitted to the resulting pairs of $P_{VSC1}$ and $Q_{VSC1}$ values to yield the gradient m and intercept c in terms of equation 5. FIG. 5 illustrates a straight line 100 fitted to points, generally indicated 102, specified by the pairs of $P_{VSC1}$ and $Q_{VSC1}$ values. The discontinuities 104 in the series of points arise from tap-changer operations in the transformers of the substations 12-16. Investigations have established that the relationship between $P_{VSC1}$ and $Q_{VSC1}$ changes on a much shorter time scale than the $Q_L$ measurement. Measurements of m and c have been made for the distribution network covering the island of Anglesey using a VSC connected into that network, and have been shown to hold valid for periods of 30 minutes.

Once valid values of m and c have been established, they can be put into equation 5 along with the measured value of $Q_L$ in order to estimate the active power that the VSC 34 needs to apply to the distribution network 10 alongside an injected reactive power of $Q_L$ in order to approximately minimise power loss in the distribution network. The VSC 34 can conduct a fresh sweep of $Q_{VSC1}$ whenever necessary in order to calculate fresh values of m, c and $P_{VSC1}$ to prevent power loss in the distribution network from drifting up.

The invention claimed is:

1. A method of controlling an electricity distribution network, wherein:
   the electricity distribution network is constructed as a mesh network including a plurality of loads and
   a voltage-source converter is connected to a point in the network; and
   the method comprises:
      while using the voltage-source converter to try to hold a voltage magnitude constant at said point, establishing a record of how, at said point, real power flowing between the network and the voltage-source converter varies with variation of reactive power that the voltage-source converter causes to flow between itself and the network;
      using a reactive-power value, proportional to a sum of the reactive-power draws of the loads, in order to look up a real-power value from the record; and
      configuring the voltage-source converter to supply into the network at said point reactive and real power at said reactive- and real-power values, respectively.

2. The method of claim 1, wherein:
   establishing said record comprises establishing a set of power-value co-ordinate pairs and fitting a curve to the co-ordinate pairs to describe a relationship between real- and reactive-power flows at said point;
   using the reactive-power value to look up the real-power value comprises using the reactive-power value in order to look up the real-power value from the curve;
   each co-ordinate pair comprises:
      a reactive-power amount; and
      a real-power amount measured as flowing into the network at said point when the voltage-source converter is operated to cause the reactive- power amount to flow into the network at said point.

3. The method of claim 2, wherein the curve is described by an equation linking real power and reactive power at said point when a voltage magnitude is constant at said point.

4. The method of claim 3, wherein the equation is a straight-line equation and/or the equation assumes the network can be modelled as a pi-equivalent circuit.

5. The method of claim 1, wherein the reactive-power draws are harvested from logs produced at each of the loads.

6. The method of claim 1, wherein a negative real- or reactive-power amount means a flow of real or reactive power, respectively, from the network into the voltage-source converter.

7. The method of claim 1, wherein the reactive-power value is one half of the sum of the reactive-power draws of the loads.

8. The method of claim 1, wherein:
the voltage-source converter is connected at said point via an isolating transformer and/or
the voltage-source converter is connected via a DC link to another voltage-source converter connected to another electricity distribution network.

9. The method of claim 1, wherein the network includes direct generators, such as sources of solar and wind power.

10. An apparatus for controlling an electricity distribution network, wherein:
the electricity distribution network is a mesh network including a plurality of loads and there is a voltage-source converter connected to a point in the network; and
the apparatus comprises a controller and an interface for connecting the controller to the voltage-source converter, wherein the controller is configured to:
establish a record of how, at said point, real power flowing between the network and the voltage-source converter varies with variation of reactive power that the voltage-source converter causes to flow between itself and the network;
use a reactive-power value, proportional to a sum of the reactive-power draws of the loads, in order to look up a real-power value from the record; and
configure the voltage-source converter to supply into the network at said point reactive and real power at said reactive- and real-power values, respectively.

11. The apparatus according to claim 10, wherein:
establishing said record comprises establishing a set of power-value co-ordinate pairs and fitting a curve to the co-ordinate pairs to describe a relationship between real- and reactive-power flows at said point;
using the reactive-power value to look up the real-power value comprises using the reactive-power value in order to look up the real-power value from the curve;
each co-ordinate pair comprises:
a reactive-power amount; and
a real-power amount measured as flowing into the network at said point when the voltage-source converter is operated to cause the reactive- power amount to flow into the network at said point.

12. The apparatus of claim 11, wherein the curve is described by an equation linking real power and reactive power at said point when a voltage magnitude is constant at said point.

13. The apparatus of claim 12, wherein the equation is a straight-line equation and/or the equation assumes the network can be modelled as a pi-equivalent circuit.

14. The apparatus of claim 10, wherein the reactive-power draws are harvested from logs produced at each of the loads.

15. The apparatus of claim 10, wherein the reactive-power value is one half of the sum of the reactive-power draws of the loads.

16. The apparatus of claim 10, wherein the voltage-source converter is connected at said point via an isolating transformer.

17. The apparatus of claim 10, wherein the network includes direct generators, such as sources of solar and wind power.

18. The apparatus of claim 10, wherein the voltage-source converter is connected via a DC link to another voltage-source converter connected to another electricity distribution network.

19. The apparatus of claim 10, wherein a controller controls the voltage-source converters to control power flow between the two networks.

20. A non-transitory computer readable medium having recorded thereon program code for causing data processing equipment to:
while using a voltage-source converter to hold a voltage magnitude constant at a point in a mesh network including a plurality of loads, establishing a record of how, at said point, a real power flowing between the mesh network and the voltage-source converter varies with variation of reactive power that the voltage-source converter causes to flow between itself and the network;
using a reactive-power value, proportional to a sum of reactive-power draws of the plurality of loads, in order to look up a real-power value from the record; and
configuring the voltage-source converter to supply into the network at said point reactive and real power at said reactive- and real-power values, respectively.

* * * * *